(12) United States Patent
Hoyt et al.

(10) Patent No.: US 6,397,163 B1
(45) Date of Patent: May 28, 2002

(54) METHOD FOR DETERMINING THERMAL EXPOSURE OF A PRODUCT

(75) Inventors: William G. Hoyt, Churchville; Thomas R. Kolankiewicz, Rochester; Nadine N. Muehlbauer, N. Chili; Dennis L. Segur, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/453,105

(22) Filed: Dec. 2, 1999

(51) Int. Cl.[7] ............................................. G01K 17/00
(52) U.S. Cl. ........................ 702/136; 702/130; 702/3; 702/131; 702/132; 206/559
(58) Field of Search ............................ 702/136, 3, 130, 702/131, 132; 206/559

(56) References Cited

U.S. PATENT DOCUMENTS

| | | | |
|---|---|---|---|
| 5,063,506 A | 11/1991 | Brockwell et al. | 364/402 |
| 5,467,285 A | 11/1995 | Flinn et al. | 364/428 |
| 5,521,813 A | 5/1996 | Fox et al. | 364/401 |
| 5,787,233 A | 7/1998 | Akimoto | 395/10 |
| 5,832,456 A | 11/1998 | Fox et al. | 705/10 |
| 5,983,198 A | * 11/1999 | Mowery et al. | 705/22 |
| 5,983,655 A | * 11/1999 | Kistner et al. | 62/208 |
| 5,999,882 A | * 12/1999 | Simpson et al. | 702/3 |
| 6,199,008 B1 | * 3/2001 | Aratow et al. | 701/120 |
| 6,298,307 B1 | * 10/2001 | Murphy et al. | 702/3 |

OTHER PUBLICATIONS

Consortium of Distribution Packaging, School of Packaging, Michigan State University, 1990–1991, pp. 45–82.
Consortium of Distribution Packaging, The School of Packaging, Michigan State University, print of web site.

* cited by examiner

*Primary Examiner*—Marc S. Hoff
*Assistant Examiner*—Paul Kim
(74) *Attorney, Agent, or Firm*—Susan L. Parulski

(57) ABSTRACT

A computer-based method of determining a thermal exposure of a product disposed within a shipping container to determine whether a conditioned environment is required for shipping. A shipping route is defined from a first geographic location to a second geographic location. The thermal characteristics of the shipping container are provided, as is a historical weather database. Ambient temperatures, cloud cover and humidity from the historical weather database are retrieved which correspond to the shipping route. A system of mathematical equations are generated to correspond the retrieved ambient temperature to an ambient temperature within the shipping container and to the product temperature. The corresponding product temperature is compared to a thermal exposure profile for the product to determine if the corresponding product temperature is within the thermal exposure profile.

10 Claims, 14 Drawing Sheets

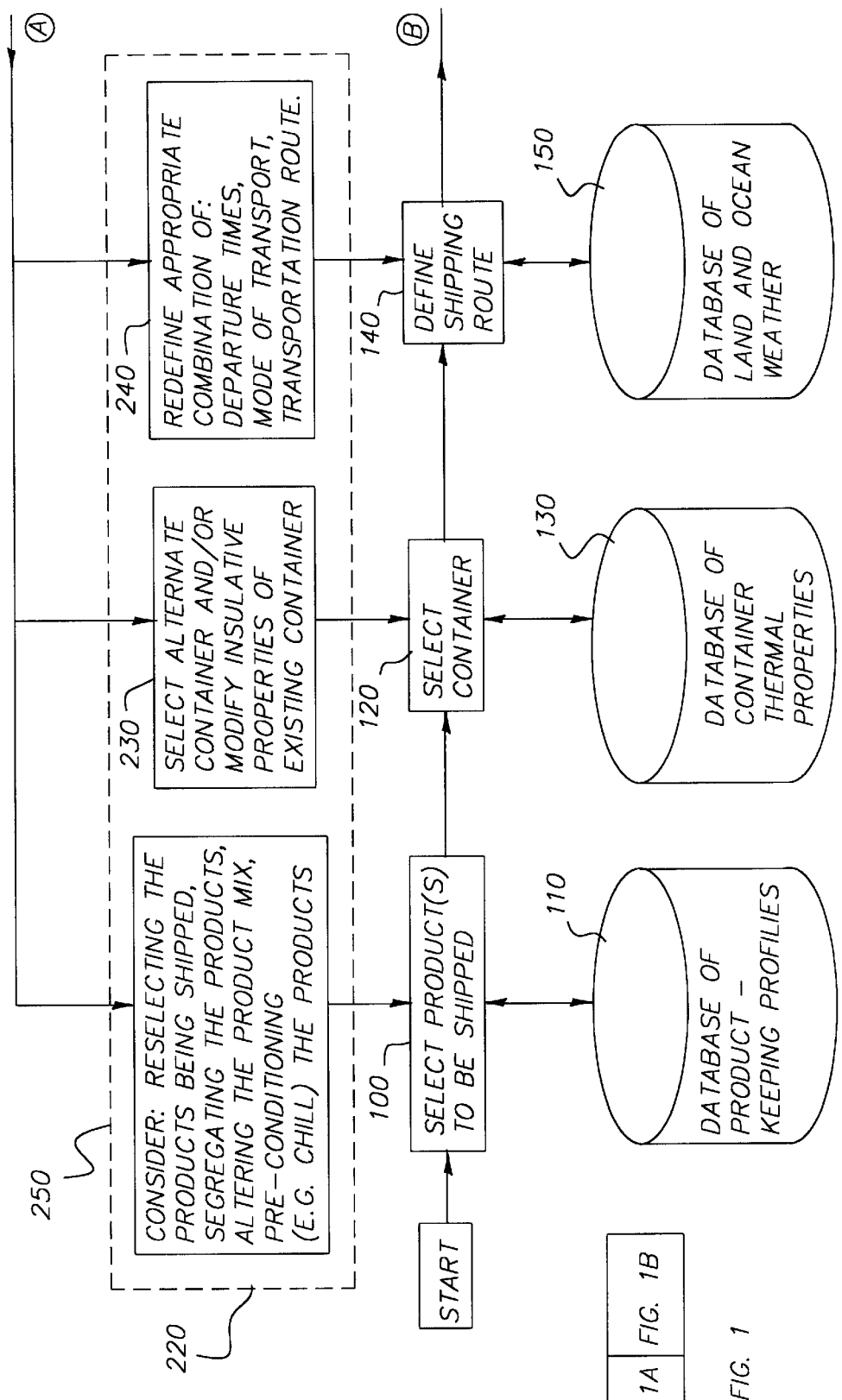

METHOD FOR DETERMINING THERMAL EXPOSURE OF A PRODUCT

FIELD OF THE INVENTION

The present invention relates generally to managing the temperature risk levels throughout a product's life cycle. More particularly, the present invention relates to a method for shipping of products so as to maintain a product-keeping profile.

BACKGROUND OF THE INVENTION

Products such as fruits, vegetables, televisions, computers, pharmaceuticals, photosensitive film and paper, chocolate, and chemicals, are shipped for distribution. Shipping of such products from a first geographic location (point A) to a second geographic location (point B) can require one or more modes of transportation, including truck, ship (i.e., boat), airplane, rail, bicycle, and automobile. The term "multi-modal transportation" is used to refer to the use of more than one mode of transportation during shipment.

During shipment, such products may require a conditioned environment (e.g., chilled, heated, humidified, non-oxidized, and/or magnetically shielded environment) to ship the product from a manufacturing/assembly site to a distribution site so as to maintain the integrity of the product. For example, milk is a product requiring refrigeration, therefore, a chilled environment is preferred during distribution to maintain the product within the product-keeping profile. Similarly, photosensitive film and paper is preferably maintained within a product-keeping profile (e.g., temperature range, humidity range) to maintain the integrity of the photosensitive characteristics. For example, if a photosensitive film's temperature-keeping requirements are exceeded, the film may not perform to its optimum expectations and may result in the product being unsuitable for its intended purpose.

Providing a conditioned environment for shipping can be expensive. For example, a refrigerated truck may be more expensive to maintain/operate than a non-refrigerated truck. Accordingly, it is economically preferable to not use a conditioned environment if such a conditioned environment is not required. Yet, weather conditions, the time of year, and location of distribution facilities, are factors which can affect the need for a conditioned shipping environment. For example, a refrigerated truck may not be needed if shipping within the state of Minnesota in January, but might be needed if shipping from Minnesota to the state of Florida in April. Accordingly, to ensure that the product integrity is maintained, a conditioned environment is generally utilized.

U.S. Pat. No. 5,467,285 (Flinn) is directed to a computer based system for controlling the movement of at least one material along an identified product path within a manufacturing process. Flinn provides a system for the movement of material between workstations within a computer based manufacturing system. Factors considered include velocity/distance or travel time, capacity, authorization required, fragility, and cost and current status of the type of transport. Flinn is directed to a "just-in-time" manufacturing system wherein the material being transported between workstations is transformed in some manner at each workstation. Thus, while this system may be suitable for its intended purpose, Flinn is not directed to maintaining a product-keeping profile during the distribution process.

U.S. Pat. No. 5,521,813 (Fox) is directed to a computer-based system and method which incorporates long-range weather forecasts in a predictive model to predict future weather impact on managerial plans, such as for buying, distribution, and budgeting. U.S. Pat. No. 5,063,506 (Brockwell) is directed to a cost estimation system which estimates the cost of supplying parts to a manufacturing facility. While these systems may be suited for their intended purposes, they do not recognize or address the need to maintain a product-keeping profile during shipping.

A Consortium for Distribution of Packaging at Michigan State University (MSU) developed a software model employing a mathematical model to predict the temperature variations in the lading inside a trailer, railcar, or other container in transit. This software model is directed to distribution within the United States within 24 hours, with a single mode of transport and a single product. While the software model may be suited for its intended purpose, it is not directed to multi-leg, multi-product, worldwide product distribution by means of multi-modal transport (including particularly ship, airplane, and staging, storage and customs area) which is needed for international companies distributing multiple products worldwide. In addition, the MSU software model does not provide for a statistical tolerance for the anticipated weather. That is, the software model does not provide for defining confidence intervals for the expected weather. Further, the MSU software model does not recognize a need for a Product Keeping Profile. Rather, the MSU software model determines the predicted temperature of the product; it does not determine if product integrity was maintained or violated. Still further, the MSU software model does not provide for condensation inside the trailer. The MSU software model provides a first order Lumped Mass method for solving a transient heat transfer problem. Such a Lumped Mass method is based on the idealized assumption that the product temperature inside the container is homogeneous and uniform throughout. However, in a real-world situation, there is typically a temperature gradient across the product(s) in the container, particularly when the container is exposed to daily weather variations. Further, while the Lumped Mass method may be suitable for a coarse solution, it is generally not suitable for manufacturers and suppliers requiring the entire contents of the container to be safely and reliable shipped so as to be in saleable condition.

Accordingly, a need continues to exist for a method of modeling shipping with the ability to determine whether a conditioned environment is needed to ship a product so as to maintain a product-keeping profile. In particular, a need continues to exist for a method of determining a product's thermal exposure as it is distributed worldwide through any combination of transportation modes in a multi-leg distribution route within a user-defined statistical bound so that a shipper can determine whether a conditioned environment is needed. A need also continues to exist for a method for determining a product's cumulative exposure to non-uniform thermal variations within a shipping container. In addition, a need continues to exist for a method of comparing a forecasted exposure to a permissible exposure (i.e., the product-keeping profile) to determine whether the product integrity has been maintained. Further, such methods should be suitable for the simultaneous transport of multiple products. Still further, a need continues to exist for determining a product's thermal exposure using historical weather data within a desired statistical reliability.

SUMMARY OF THE INVENTION

An object of the invention is to provide a method of determining a product's thermal exposure during shipping. Another object of the invention is to provide such a method directed to the worldwide distribution of a product through any combination of transportation modes in a single or multi-leg distribution route and at any time of the year.

Still another object of the invention is to provide such a method for determining a product's cumulative exposure to non-uniform thermal variations within a shipping container.

Yet another object of the invention is to provide a method of determining a forecasted thermal exposure and comparing the exposure to a permissible exposure (i.e., a product-keeping profile) to determine whether a conditioned environment is needed for shipping.

Still yet another object of the invention is to provide such a method which is suitable for the simultaneous transport of multiple products and which uses historical weather data within a desired statistical reliability.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided a method of determining a cumulative thermal exposure of a product disposed within a shipping container. The method comprises defining a shipping route from a first geographic location to a second geographic location, with the shipping route comprising at least one geographic position intermediate the first and second geographic location. A thermal product-keeping exposure profile for the product is provided, as is the thermal characteristics of the shipping container and a historical weather database of ambient temperature. An ambient temperature is retrieved from the historical weather database corresponding to the first and second geographic locations and at least one geographic position along the shipping route. The retrieved ambient temperature is then corresponded to an ambient temperature within the shipping container, and then the ambient temperature within the shipping container is corresponded to a product temperature of the product disposed within the shipping container. A cumulative thermal exposure of the product is developed using the corresponding product temperature. A determination is then made regarding whether the cumulative thermal exposure of the product is within the thermal product-keeping exposure profile.

The present invention provides a method of determining a product's thermal exposure as it is distributed worldwide through any combination of transportation modes in a multi-leg distribution route. The present invention also provides a method for determining a product's cumulative thermal exposure to non-uniform thermal variations within a shipping container. Still further, the present invention provides a method of comparing a forecasted exposure to a permissible exposure to determine whether a conditioned environment is appropriate during shipping. The method is suitable for the simultaneous transport of multiple products and uses historical weather data within a desired statistical reliability.

BRIEF DESCRIPTION OF THE DRAWINGS

The foregoing and other objects, features, and advantages of the invention will be apparent from the following more particular description of the preferred embodiments of the invention, as illustrated in the accompanying drawings.

FIGS. 1A and 1B generally illustrate a method for determining thermal exposure of a product during shipping in accordance with the present invention;

FIG. 2 shows the selection of the product(s) to be shipped in accordance with the method of the present invention for the first example;

FIG. 3 shows the selection of the shipping container(s) for the first example in accordance with the method of the present invention;

FIG. 4 shows the selection of the shipping route for the first example in accordance with the method of the present invention;

FIG. 12 shows the selection of the multi-leg shipping route for the second example in accordance with the method of the present invention;

FIG. 13 shows detailed information of the shipping route for the second example in accordance with the method of the present invention, specifically, staging area information;

FIG. 14 shows detailed information of the shipping route for the second example in accordance with the method of the present invention, specifically, ship information;

FIG. 18 shows for the second example a multi-dimensional analysis of the shipment.

DETAILED DESCRIPTION OF THE INVENTION

Figure 1B:
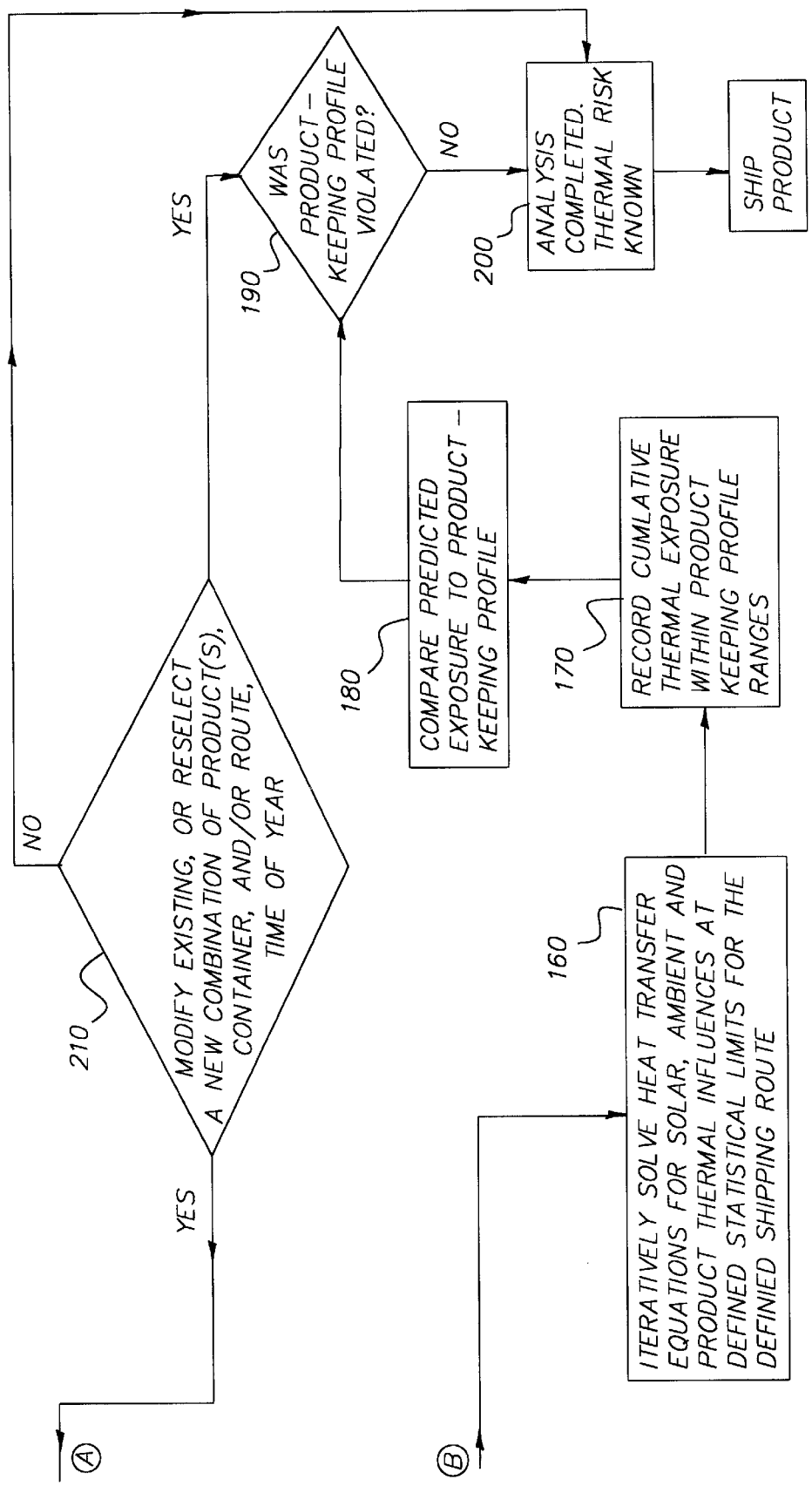

The following is a detailed description of the preferred embodiments of the invention, reference being made to the drawings in which the same reference numerals identify the same elements of structure in each of the several figures.

The present invention provides a method of determining a product's thermal exposure as it is distributed worldwide through any combination of transportation modes in a single or multi-leg distribution route. While the method of the present invention is suitable for various products, for ease of discussion the method will be discussed with regard to photosensitive film or paper, in particular, 35 mm film.

As discussed above, 35 mm film is preferably maintained within a product-keeping profile to maintain the integrity of the product's photosensitive characteristics. The product-keeping profile for 35 mm film may include a temperature range, humidity range, magnetic field range, and range of shock/vibrations and other physical phenomena during transport. For example, during shipping, a defined temperature range needs to be maintained.

With regard to temperature and humidity, Applicants have discovered that various factors may affect the temperature and humidity during shipping of 35 mm film. For example:

- the mode of transportation, including "staging time" wherein the product is stationary, for example, in a train yard;
- the shipping destination and route;
- the weather conditions, including cloud cover and ambient humidity;
- the shipping container's characteristics, including the container's age, size, insulation characteristics, and cooling/heating characteristics;
- the location of the product within the shipping container;
- the variety of products within the shipping container (i.e., is a single product or are multiple products disposed within the shipping container); and
- the packing compactness/density of the product within the shipping container (e.g., are air gaps present, is the product loaded on pallets).

FIGS. 1A and 1B generally describe the method according to the present invention. As illustrated, the product(s) to be shipped is selected (100) and the product-keeping profile is defined for each product. A product-keeping profile may include information regarding factors which affect the product, including temperature, humidity, and magnetic fields. A database of product-keeping profiles (110) for a particular product may be utilized.

Shipping container information is also defined (120). Such shipping container information may include the dimensions, wall thickness, and wall heat transfer coefficient values. If more than one shipping container is used in the shipping route, each container is defined. Note that an assumption is made that the container is not refrigerated unless specifically defined by the user. A database of container thermal properties (130) may be utilized.

The shipping route is defined (140). This may comprise such shipping information as the starting location, destination, mode(s) of transportation, shipping duration, the shipping dates, and the initial shipping conditions. The method of the present invention provides for the shipping modes of truck, ship, airplane, rail, and staging area. The initial shipping conditions may include relative humidity and cloud cover, and the shipping conditions may also include the ambient temperature of the shipping container as the product is packed. While the initial shipping condition information can be manually defined, such information may be obtained from a historical weather database, as will become apparent below. Particular or detailed shipping information can be defined for the shipping route. For example, such information may include whether the driver of a truck will be taking a rest stop.

Travel distances are determined using methods known to those skilled in the art. For example, using the great circle method with an optional correction factor which can be applied knowing the mode of transport and the transport infrastructure of the region being traveled. Other known methods for determining a travel distance over land include a network trace analysis technique performed on road/rail segments that are cataloged in a transportation infrastructure data base, and a use of remote sensing satellite imagery to determine road/rail infrastructure.

A historical weather database is provided (150) so that ambient temperature from the weather database is corresponded to the shipping route. The ambient temperature from the weather database is retrieved for the defined route of travel.

A set of mathematical heat transfer equations are derived from the defined information, and are iteratively solved (160) to obtain an ambient temperature within the shipping container. The internal shipping container temperatures for the duration of the shipping route are determined as is the product temperature (170). As such, the cumulative temperature effects for the product are determined for every hour, or at any user-defined time interval. These cumulative effects are compared (180) with the user-defined product-keeping profile. A determination is provided whether the product-keeping profile has been maintained or violated (190). By such a determination, the thermal risk is known (200), and a user can understand whether a conditioned environment is desired for shipping.

If a determination is made that the product-keeping profile has been violated, the user may investigate alternatives (210). For example, a user can select alternate products or determine if an alternate packing configuration would maintain the defined product-keeping profile (220). Another alternative is to select an alternate shipping container (230). A further alternative is to redefine the shipping route (240). Collectively, steps 220, 230, and 240 can provide optimization features (250) to provide a user with the conditions in which a conditioned environment would not be needed, either for the defined shipping route or an alternate route.

Several examples are now provided to more particularly describe the invention.

EXAMPLE 1

Referring now to FIGS. 1A, 1B, and 2–9, a first example is now provided for shipping a single product within the United States using a single mode of transportation. The method of the present invention has been implemented using software, and for ease of discussion, the figures illustrate computer screens of the implemented computer-based system.

Figures 2, 3:
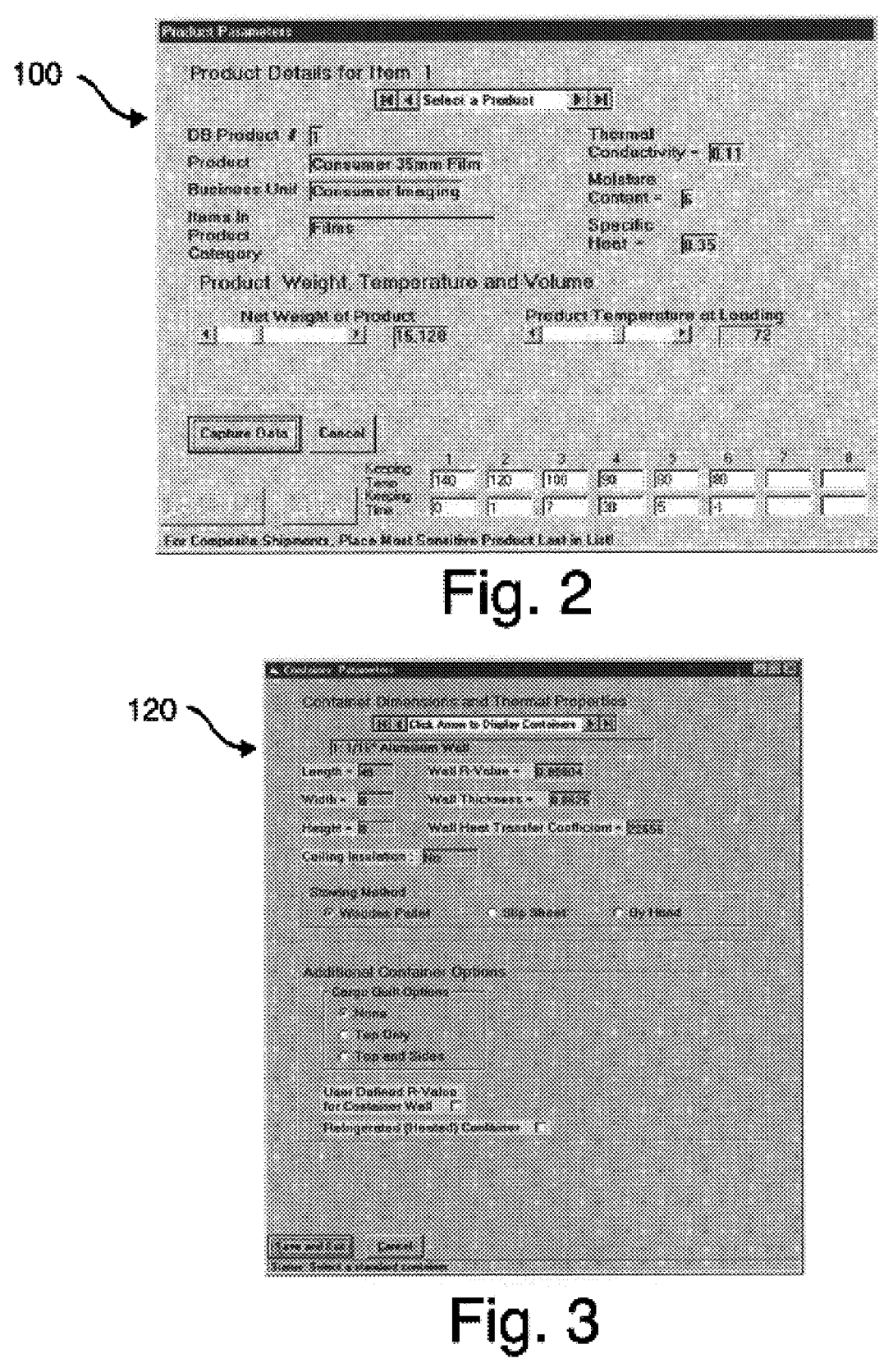

Referring to FIG. 2, the product to be shipped is defined (100). For the present example, 15,120 pounds (6858 kilograms) of 35 mm film is to be shipped with an initial shipping condition of 72 degrees. The product-keeping profile is unique to the product. For example, for illustrative purposes, the product-keeping profile for 35 mm film identifies that the film be maintained during shipping at a temperature less than 80 degrees F. to maximize product life. More particular temperature information can be provided. For example, for illustrative purposes for the instant example, the thermal exposure profile can be extended to include no exposure to a temperature above 140 degrees F.; exposure to a temperature range of 120 to 140 degrees F. for no longer than 1 day; exposure to a temperature range of 100 to 120 degrees F. for no longer than 7 days; exposure to a temperature range of 90 to 100 degrees F. for no longer than 30 days; and exposure to a temperature range of 80 to 90 degrees F. for no longer than 5 days. Further product-keeping profile information can include thermal conductivity, moisture content, and specific heat, as shown in FIG. 2.

Referring to FIG. 3, the information regarding the shipping container is defined (120).

Figures 4, 12, 18:
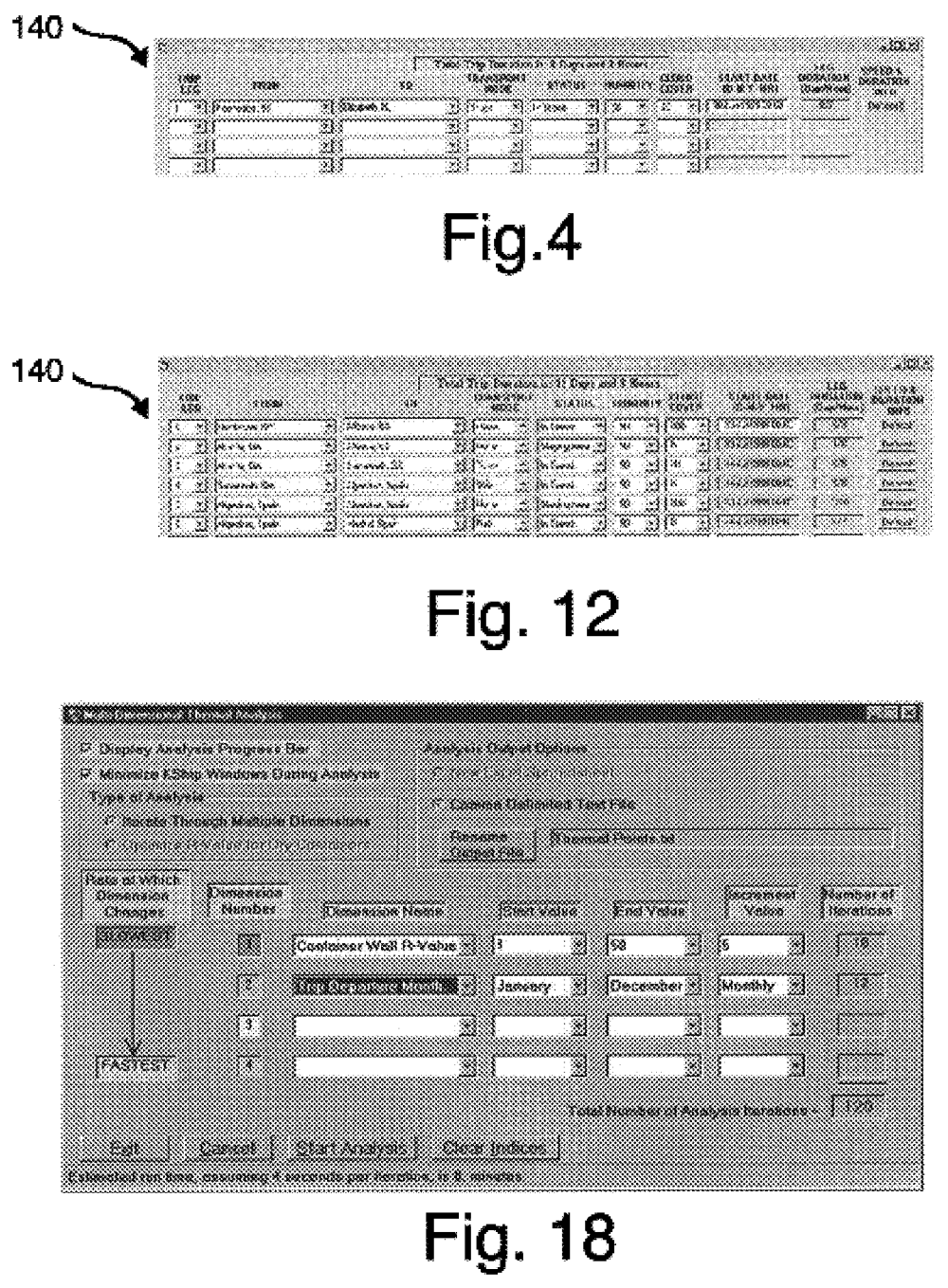
Figure 5:
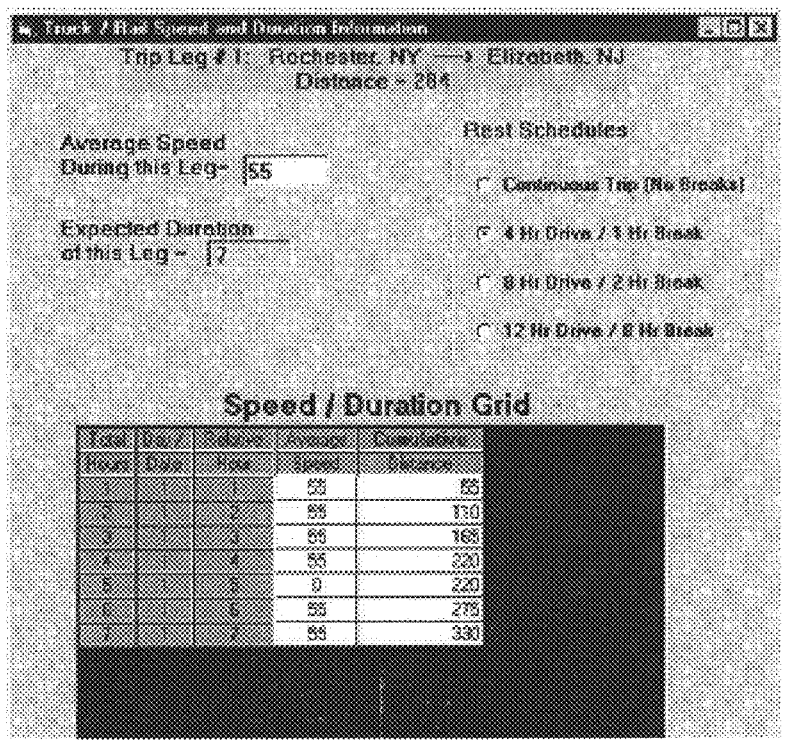
FIG. 5 shows detailed information of the shipping route for the first example in accordance with the method of the present invention.

The shipping route is defined (140). As best illustrated in FIG. 4, for the instant example, the product is to be shipped from a first geographic location of Rochester, N.Y. (Point A) to a second geographic location of Elizabeth, N.J. (Point B)

in 7 hours by truck, starting at midnight on Jun. 30, 1999. The outdoor relative humidity is estimated as 50 percent, with the cloud cover estimated at 30 percent. Referring to FIG. 5, particular information regarding speed and duration can be provided. For the instant example, a rest schedule is included during transport.

A historical weather database is provided (150). A suitable historical weather database is available from the National Climatic Data Center of the U.S. government. This database provides historic weather data of ambient air temperature from worldwide geographic locations throughout the year. While suitable weather databases may provide daily ambient temperatures, weather databases which provide monthly data have been found suitable. With such monthly data, known statistical/probability methods can be used to estimate the thermal exposure within the month. For example, if a particular data set provided an average high temperature of 95 degrees F. and an average low temperature of 75 degrees F. these high/low values may be used directly. Alternatively, known statistical methods (such as $3\sigma$) could be used to ensure that the range of temperature is encompassed in determining a temperature exposure. (Such statistical tolerancing provides for the ability to determine risk assessment.) Still further, the high temperature may be incorporated at morning/afternoon travel times while the low temperature may be incorporated at evening travel times. The historical database may also provide historical data regarding cloud cover and humidity which may be incorporated.

Figure 6:
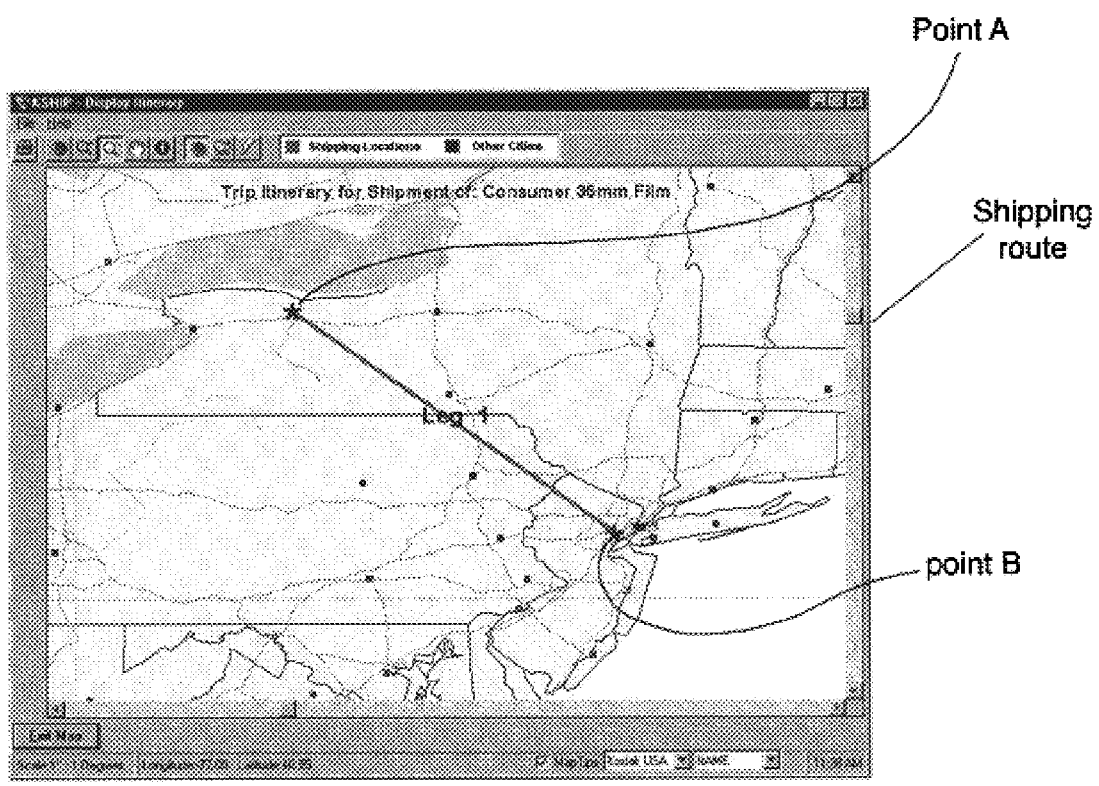
FIG. 6 illustrates a map showing a starting and ending point of the shipping route for the first example.

Accessing the historical weather database for the shipping dates, the ambient temperature data are obtained for the geographic locations defined by the shipping route. For example, as shown in FIG. 6, for the instant example, the ambient temperature information is obtained at the defined geographic locations, i.e., Rochester, N.Y. (Point A) and Elizabeth, N.J. (Point B). The maximum and minimum temperatures of the two geographic locations may be used. Alternatively, the temperature utilized may be an average of the maximum and minimum temperatures of the two geographic locations. Comparing the weather variability during transit, adjustments can be made to account for narrow or wide variations in the weather conditions. That is, the temperatures along the shipping route may be adjusted for continuity. More detailed temperature information may be incorporated by defining a more detailed shipping route, for example, by defining several intermediate geographic positions through which the shipment will travel from Rochester, N.Y. to Elizabeth, N.J.

Figure 7:
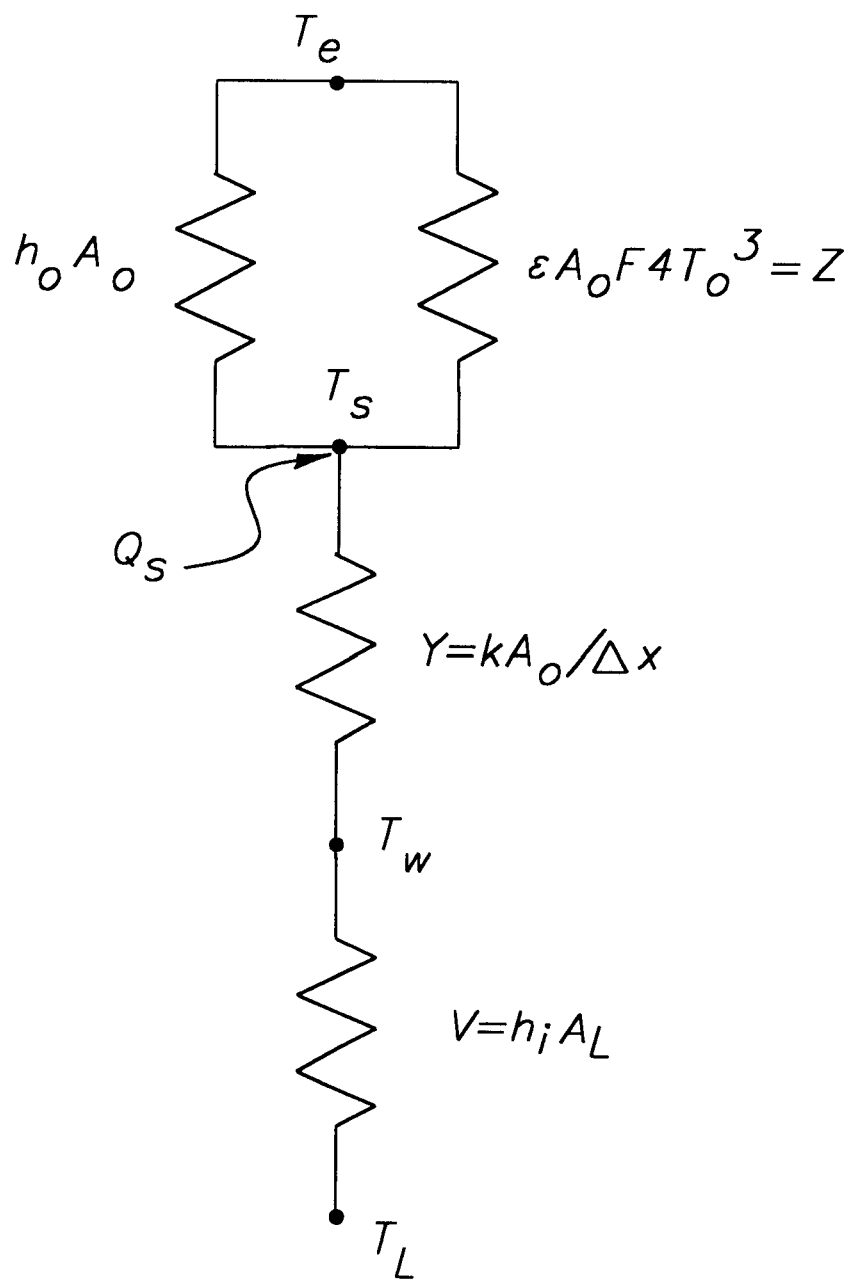
FIG. 7 shows a heat transfer circuit analysis model for the first example in accordance with the present invention.

The ambient temperature data is then corresponded to a temperature within the shipping container, and accordingly to the product, using conduction, convention, and radiation heat transfer equations. This correspondence may be accomplished using known heat transfer circuit analysis techniques. For example, the system may be modeled as shown in FIG. 7. As illustrated, the value $T_e$ represents the ambient temperature (i.e., the temperature of the environment). The resistance value noted as $h_oA_o$ represents the turbulent or laminar boundary layer of air on the container's outside surface. The resistance value referred to as Z represents the radiation of the container. The resistance referred to as Y represents the resistance to flow of heat through the wall of the shipping container. The value of $T_w$ represents the temperature of the shipping container wall. The value of V represents the convection layer of air in the shipping container. $T_L$ represents a lumped mass of the product being shipped. Alternately, if a more detailed prediction of the product temperature is desired, a non-uniform, non-lumped mass thermal analysis can be performed using known equations for two-dimensional and three-dimensional transient analysis. A two-dimensional transient thermal analysis more accurately approximates actual shipping conditions when the shipment is non-uniformly insulated. Such is the situation when a thermal protective covering (such as an insulating blanket) is placed on the top of the product load (inside the container), but not on the sides. Using such a model, mathematical equations are derived using known mathematical modeling techniques, and the ambient temperature within the shipping container and the temperature of the product can be solved for. Known iterative methods may be employed to solve for the ambient temperature within the shipping container at a mid-point of the container and also solve for the product temperature. In addition to solving the transient heat transfer equations for lumped masses, the thermal analysis engine of the present invention provides solutions for the transient heat transfer problem to be solved using the more realistic non-uniform thermal analysis. This approach is particularly relevant when there are differences in insulation type and/or thickness of insulation on each of the 6 sides of the shipment.

Figure 8:
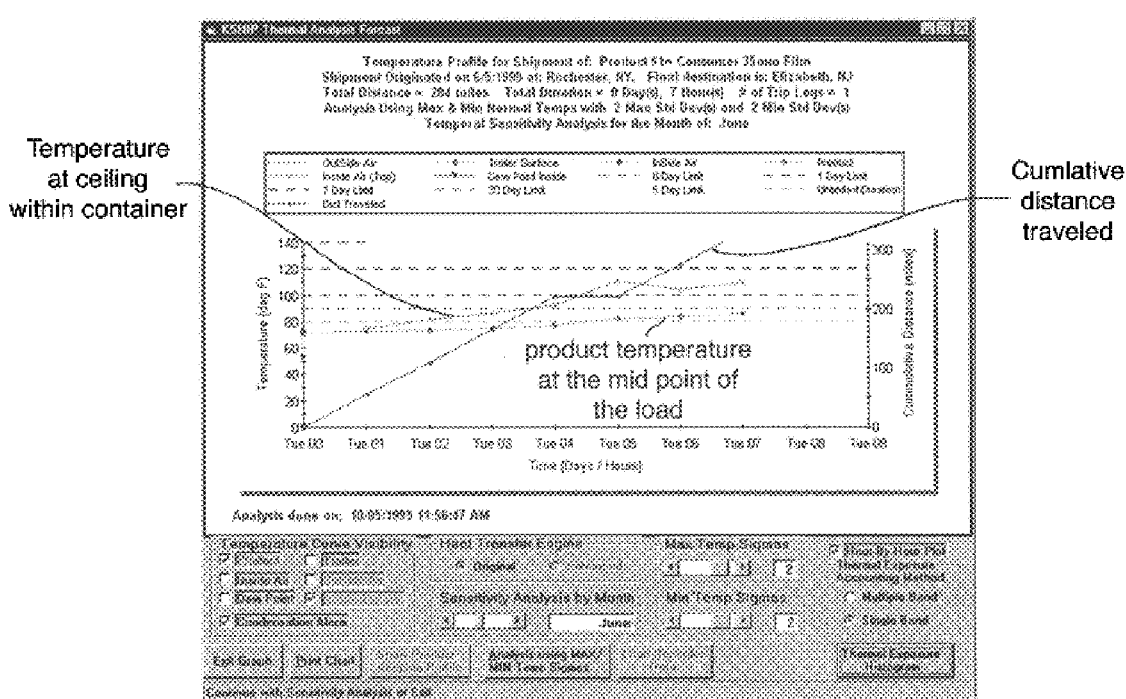
FIG. 8 shows a graph illustrating the ambient temperature at the mid-point and ceiling of the shipping container for the shipping route of the first example.

Applicants have unexpectedly discovered that the ambient temperature within the shipping container may vary from a bottom wall (e.g., floor) of the shipping container to a top wall (e.g., ceiling) of the container from a range between about −3 to about 30 degrees F. between midnight and solar noon. The temperature range may be higher in travel areas close to the equator or when a thermal protective covering is employed. Accordingly, the ambient temperature determined above is attributed at a mid-point of the container. Therefore, Applicants further determine the ambient temperature at the ceiling of the shipping container. The determination of the ceiling temperature may be made by assuming a constant temperature differential between the mid-point and ceiling of the container, for example a constant 20 degrees F. Alternatively, an assumption of a ramped differential may be made wherein there is no differential at dawn and a 20 degree F. differential at solar noon. Similarly, no temperature differential is assumed at dusk (or alternatively, at one hour after dusk). FIG. 8 shows a graph illustrating the ambient temperature within the shipping container at both the mid-point of the container, and at the ceiling of the container as a function of time. The cumulative distance traveled is also illustrated in FIG. 8.

Once the product temperatures have been determined at the various geographic locations along the shipping route, the cumulative thermal exposure is determined by processing the various product temperatures over the duration of the shipping route. That is, for each product temperature that is determined, the duration that the product was exposed to that particular temperature is stored. The overall cumulative effects of the thermal exposure for the entire duration of the shipment can then be derived.

Figure 9:
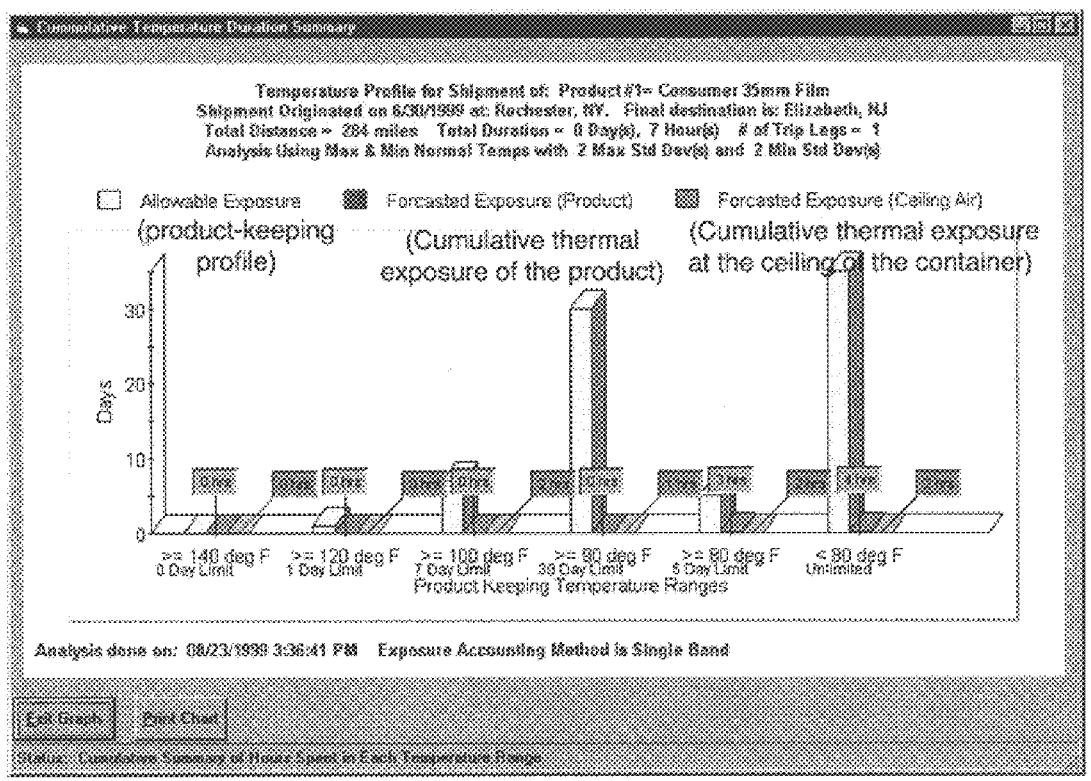
FIG. 9 shows a graph for the first example illustrating the cumulative thermal exposure of the product relative to the product-keeping profile.

Once the cumulative thermal exposure is determined for the defined shipping route, the product-keeping profile is compared with the product temperature at the mid-point and at the ceiling of the shipping container to determine if the product-keeping profile was maintained or violated. FIG. 9 shows a graph illustrating the thermal exposure levels for the instant example wherein a bar graph is shown for the allowable exposure (i.e., the product-keeping profile), the cumulative thermal exposure at the mid-point of the shipping container, and the cumulative thermal exposure at the ceiling of the shipping container. If either of the cumulative thermal exposures is greater than the allowable exposure, the product-keeping profile is considered as being violated. As illustrated in FIG. 9, for the instant example the ambient temperatures at both the mid-point and ceiling did not exceed 120 degrees F. at any time during the shipping route. For example, the figure indicates that the product-keeping profile requires no more than 30 days of exposure to a temperature between 90–100 degrees F. The figure indicates that there was zero hours of cumulative thermal exposure at a temperature between 90–100 degrees F. at the mid-point of the container and one hour of cumulative thermal exposure at a temperature between 90–100 degrees F. at the ceiling of the container. Similarly, the figure indicates that the product-keeping profile provides unlimited exposure to a temperature below 80 degrees F. The figure indicates that there was four hours of cumulative thermal exposure at a temperature below 80 degrees F. at the mid-point of the container and two hours of cumulative thermal exposure at a temperature below 80 degrees F. at the ceiling of the container. Accordingly, the model suggests that a conditioned environment would not be needed to maintain the defined product-keeping profile for the defined shipping route.

EXAMPLE 2

Referring now to FIGS. 1A, 1B, and 10–17, a second example is now provided for international shipping of a plurality of products in a single shipping container using a plurality of modes of transportation. The method of the present invention has been implemented using software, and for ease of discussion, the figures illustrate computer screens of the implemented computer-based system.

Figure 10:
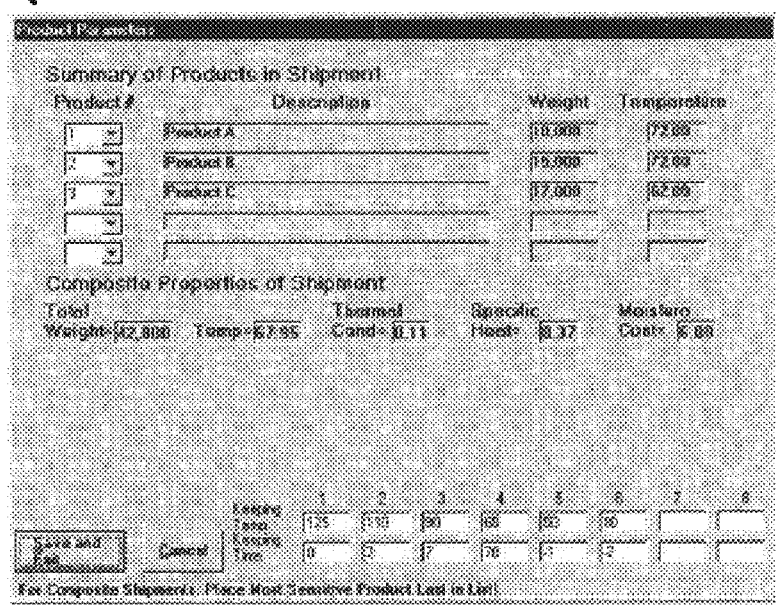
FIG. 10 shows the selection of multiple products to be shipped in accordance with the method of the present invention for the second example.

Referring to FIG. 10, the product to be shipped is defined (100). For the present example, 3 different products are to be shipped: 10,000 pounds (4545 kilograms) of Product A, 15,000 pounds (6818 kilograms) of Product B, and 17,000 (7727 kilograms) pounds of Product C. Products A and B have an initial shipping temperature of 72 degrees while Product C has an initial shipping temperature of 62 degrees. The composite properties of the shipment are defined as shown in FIG. 10 and include thermal conductivity, moisture content, and specific heat. The composite properties are determined using a weighted average. The product-keeping profile for each product is unique. However, for multiple-product shipments, the product-keeping profile for the most temperature-sensitive product is used for the entire shipment. For the instant example, the thermal exposure profile for the shipment is defined as having no exposure to a temperature above 125 degrees F.; exposure to a temperature range of 110 to 125 degrees F. for no longer than 2 days; exposure to a temperature range of 90 to 110 degrees F. for no longer than 7 days; exposure to a temperature range of 65 to 90 degrees F. for no longer than 70 days.

Figure 11:
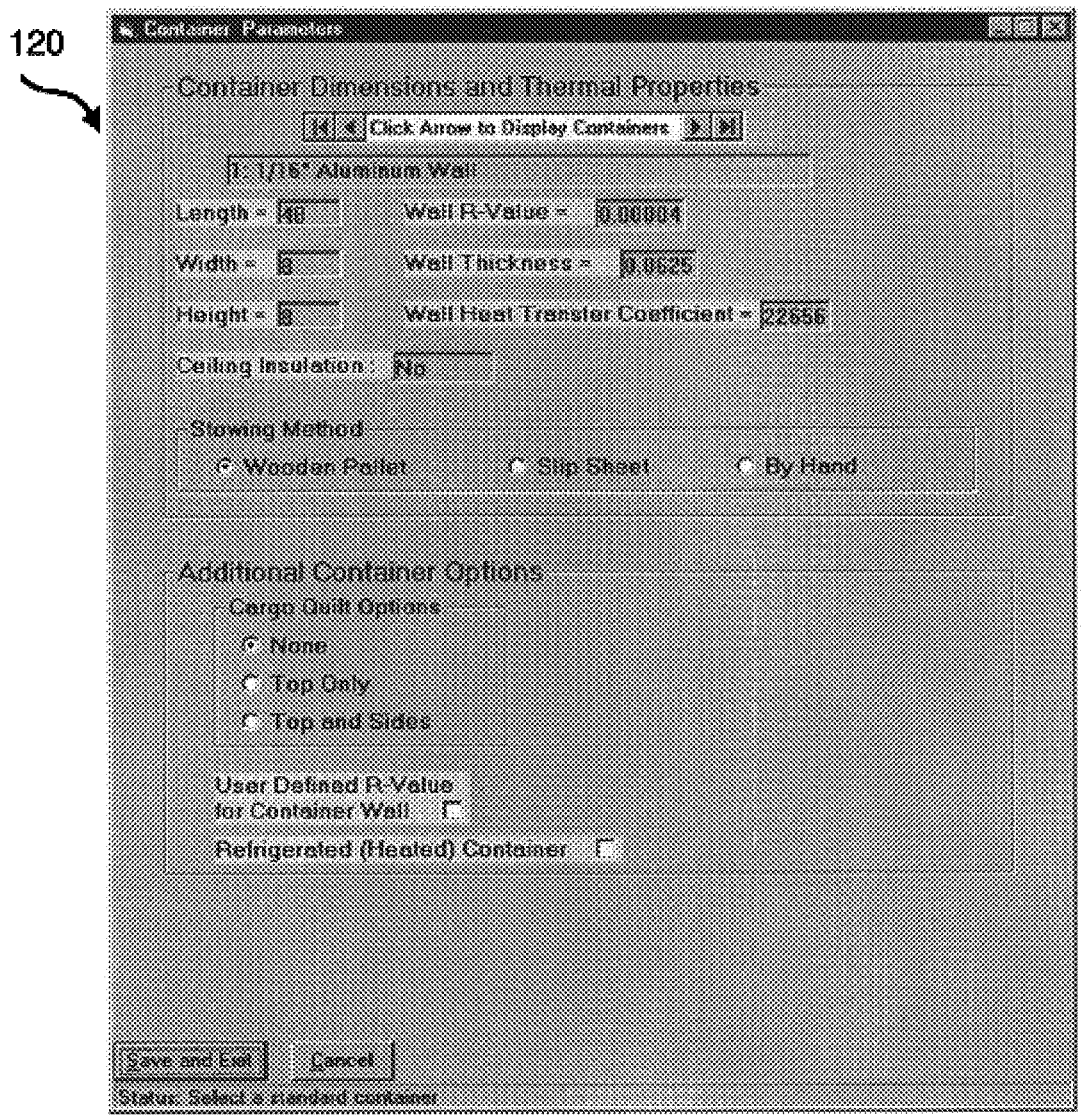
FIG. 11 shows the selection of the shipping container for the second example in accordance with the method of the present invention.

Referring to FIG. 11, the information regarding the shipping container is defined.

Figure 15:
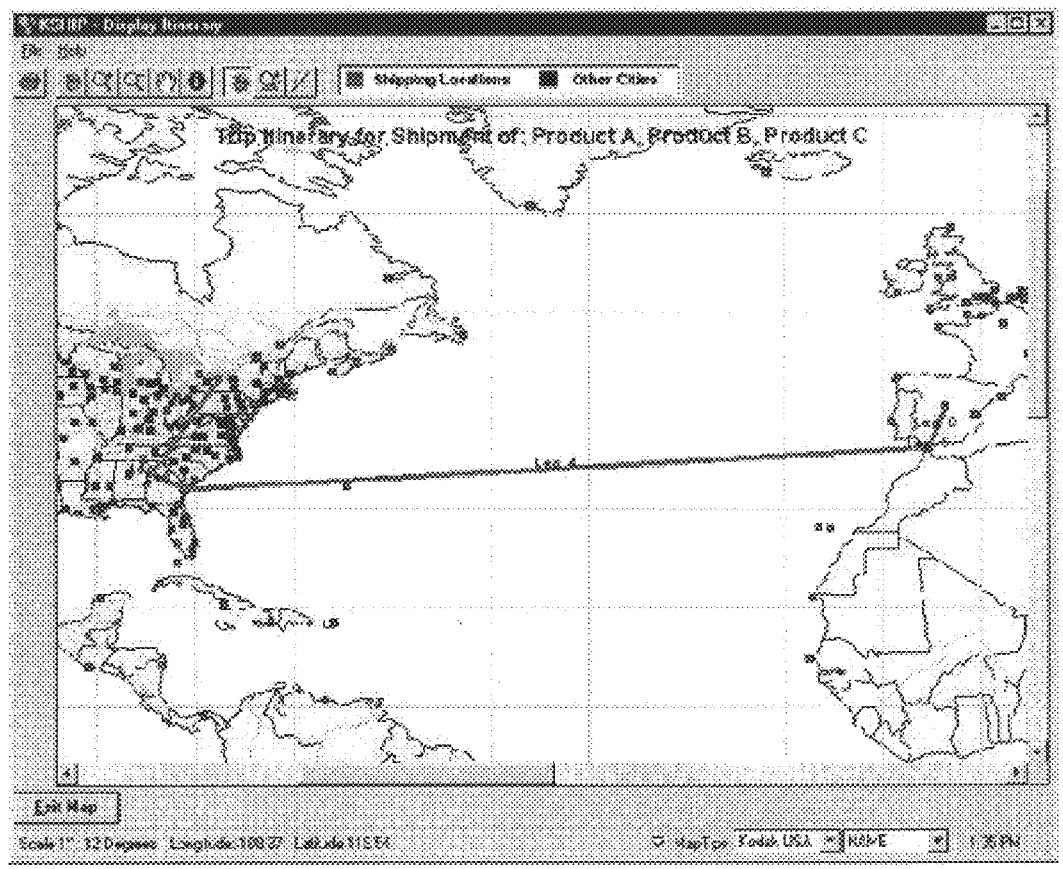
FIG. 15 illustrates a map showing a starting point, ending point, and intermediate locations of the shipping route for the second example.

The shipping route is defined (140). As best illustrated in FIGS. 12 and 15, for the instant example, the product is to be shipped from Rochester, N.Y. (Point A) to Madrid, Spain (Point B). The shipping route comprises at least one geographic position intermediate the first and second geographic location which includes a stationary staging area or a transfer to a different mode of transportation. For the instant example, the intermediate positions are in Atlanta, Savannah, and Algeciras, Spain. Four modes of transportation are used in a six travel-leg shipment route which takes a total of 11 days and 9 hours, starting at midnight on Jul. 13, 1999. Referring to FIG. 12, the first travel-leg of the shipment is by airplane, the second travel-leg is a stationary staging area, the third travel-leg is by truck, the fourth travel-leg is by ship/boat, the fifth travel-leg is a stationary staging area, and the sixth travel-leg employs a train.

Particular information regarding speed and duration can be provided, as can humidity and cloud cover conditions. Particular information regarding the travel factors are provided for each travel-leg. For the instant example, referring to FIG. 13, for the second travel-leg, the shipping container is expected to be staged for one day in Atlanta, Ga. outside where there is no protection from the sun and other weather elements.

Figures 13, 14:
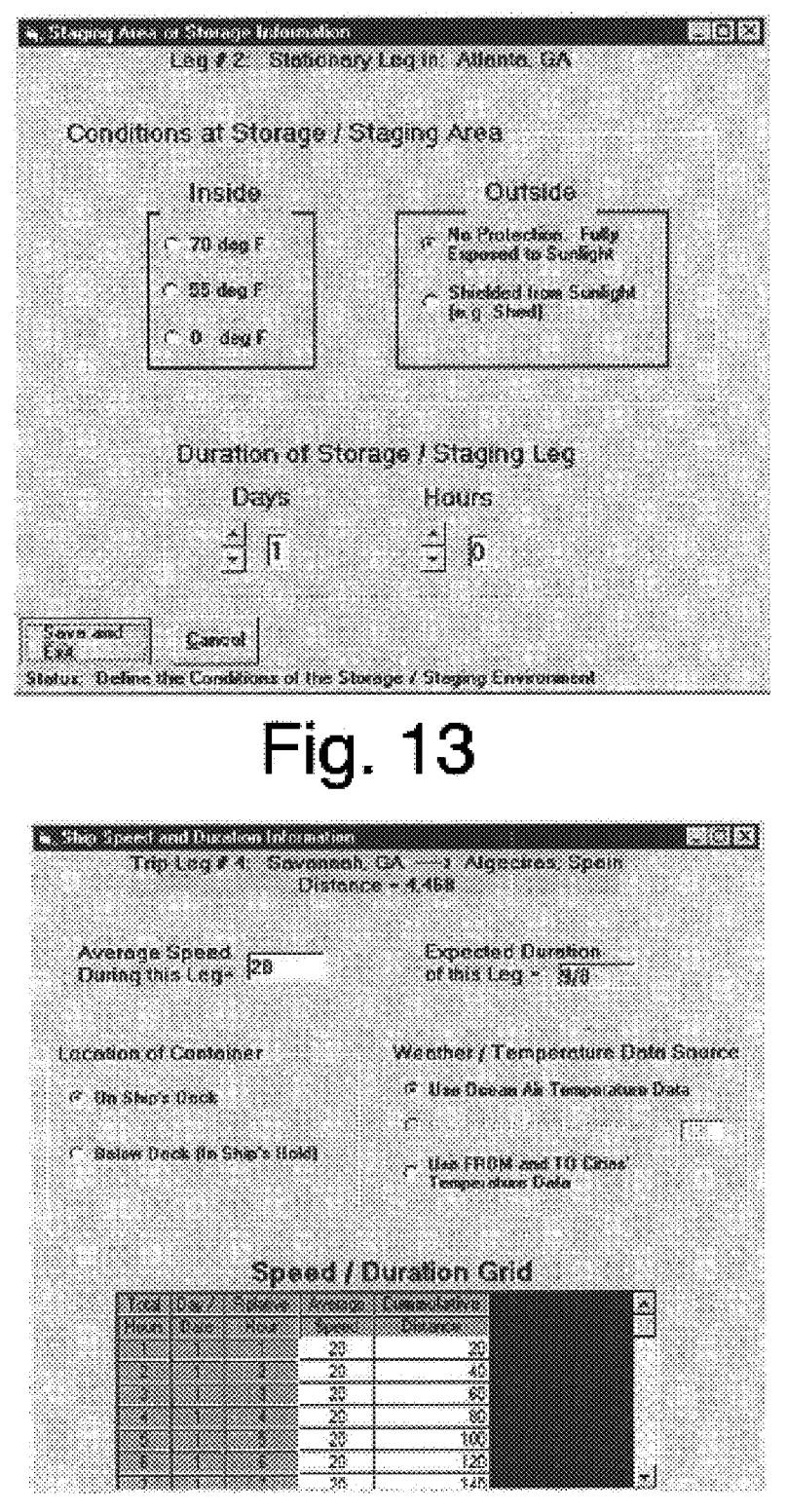

Similarly, referring to FIG. 14, for the fourth travel-leg, a ship/boat is employed wherein the shipping container is expected to be located on the ship's deck wherein it will be exposed to the ocean's elements and solar loads rather than in the ship's hold. When the shipping container is located in the ship's hold, an additional 10 degree F. is added to the ambient temperature to simulate that the hold is generally 10 degree F. warmer than the ambient/outside temperature acquired from the historical weather database. Further, if the ship is traveling along the coast, the historical weather database information for the coastal cities along the route may be preferred rather than the historical oceanic weather information.

For the first travel-leg employing the airplane, the shipping container is assumed to be exposed to a constant temperature, defined by the user. Alternatively, the user can define the airplane's cargo bay air temperature as being the average of the temperatures of the two geographic locations between which the airplane is traveling.

Accessing the historical weather database for the shipping dates, the ambient temperature data is obtained for the geographic locations and positions defining the shipping route. For land-based travel legs, the mean thermal conditions of the two geographic locations of the travel leg are preferably employed. For a travel leg over an ocean by ship, a reverse-least-squares straight line fit method is employed to the travel route when accessing the historical weather database to identify the closest available weather data information.

The ambient temperature data is then corresponded to a temperature within the shipping container using conduction, convention, and radiation heat transfer equations. This correspondence is accomplished using known heat transfer circuit analysis techniques as described above and applying known iterative methods to solve for the ambient temperature within the shipping container at the mid-point of the container and to solve for the product temperature. A heat transfer circuit analysis is conducted for each container defined.

Figure 16:
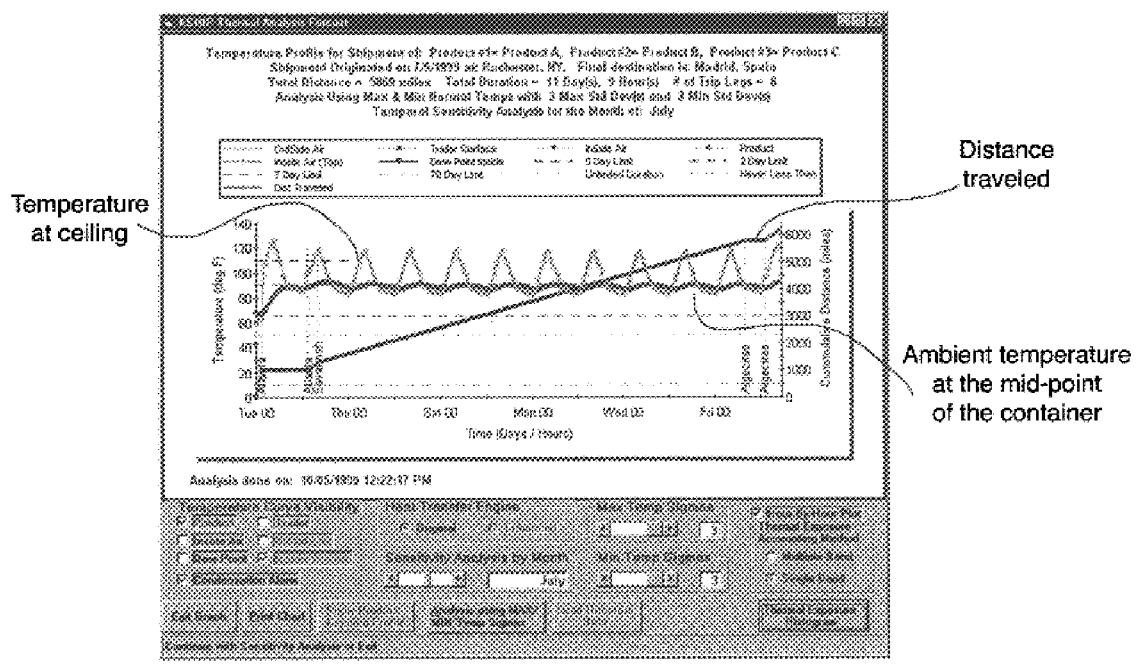
FIG. 16 shows a graph illustrating the ambient temperature at the mid-point and ceiling of the shipping container for the shipping route of the second example.

As described above, after determining the ambient temperature at the mid-point of the container, Applicants further determine the ambient temperature at the ceiling of the shipping container. FIG. 16 shows a graph illustrating the ambient temperature within the shipping container at both the mid-point of the container, and at the ceiling of the container as a function of time. The cumulative distance traveled is also illustrated in FIG. 16.

Figure 17:
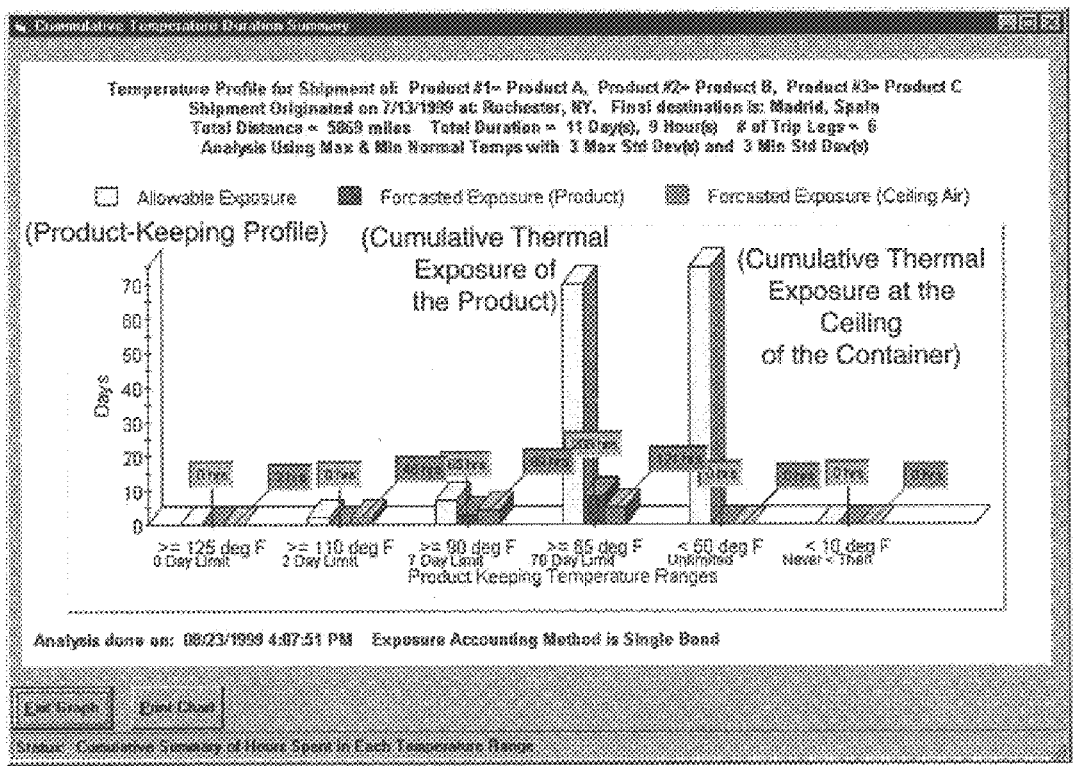
FIG. 17 shows a graph for the second example illustrating the cumulative thermal exposure of the product relative to the allowable thermal exposure of the product-keeping profile.

Once the thermal exposure values are obtained and stored for the defined shipping route, the product-keeping profile is compared with the product temperature at the mid-point and at the ceiling of the shipping container to determine if the product-keeping profile was maintained or violated. FIG. 17 shows a graph illustrating the thermal exposure levels for the instant example wherein a bar graph is shown for the allowable exposure (i.e., the product-keeping profile), the cumulative thermal exposure at the mid-point of the shipping container, and the cumulative thermal exposure at the ceiling of the shipping container. If either of the cumulative thermal exposures is greater than the allowable exposure, the product-keeping profile is considered as being violated. For example, the ambient temperature at the ceiling exceeded 110 degrees F. but did not exceed 125 degrees F. for 48 hours, and the ambient temperatures at the mid-point exceeded 90 degrees F. but did not exceed 110 degrees F. for 65 hours. These temperature ranges are within the user-defined product-keeping profile. However, the product disposed near the ceiling of the container reached a temperature greater than 125 degrees F. for 2 hours. Accordingly, the model suggests that a conditioned environment is needed to maintain the defined product-keeping profile for the defined shipping route.

To ship and distribute products as cost efficiently as possible, a manufacturer of thermally sensitive products desires to understand how the required R-value of the shipping container varies throughout the year, when distributing products along a specified distribution route using non-refrigerated containers. Correspondingly, there is a need to conduct multi-dimensional thermal analysis by allowing the user to vary time of year, ambient temperature, and the shipping container's insulation properties. FIG. 18 illustrates the multi-dimensional thermal analysis of the shipment for the second example.

While the present invention has been illustrated using a thermal exposure level, the method in accordance with the present invention can be extended to other shipping factors. For example, humidity exposure can be a factor as well as dew point. Therefore, it is desirable to maintain the product temperature above the dew point temperature.

The present invention can be further extended to thermal exposure levels of non-shipping applications. For example, the "product" can be anything susceptible to thermal exposure, including a human or animal. The "shipping container" could be corresponded to a house or other structure, or the human/animal could be traveling in a truck, plane, automobile, ship as is the product as described above. Such an application could be used to predict or forecast extreme heat conditions so communities and relief agencies could take appropriate actions.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST:

100 select product to be shipped
110 database of product-keeping profiles
120 select container
130 database of container thermal properties
140 define shipping route
150 database of land and ocean weather
160 iteratvely solve heat transfer equations
170 record cumulative thermal exposure
180 compare predicted exposure to product-keeping profile
190 determine if product-keeping profile was maintained or violated
200 thermal risk is known
210 investigate alternatives
220 select alternate products or alter packing configuration
230 select alternate shipping container
240 redefine shipping route
250 optimization features
$T_e$ ambient temperature
$h_oA_o$ turbulent or laminar boundary layer of air on the container's outside surface
Z radiation of the container
Y resistance to flow of heat through the wall of the shipping container
$T_w$ temperature of the shipping container wall
V convection layer of air in the shipping container
$T_L$ lumped mass of the product being shipped

What is claimed is:

1. A method of determining a cumulative thermal exposure of a product disposed within a shipping container, the method comprising:

defining a shipping route from a first geographic location to a second geographic location, the shipping route comprising at least one geographic position intermediate the first and second geographic location, the shipping route having a time duration;

providing a thermal product-keeping exposure profile for the product;

providing thermal characteristics of the shipping container;

providing a historical weather database of ambient temperature;

retrieving an ambient temperature from the historical weather database corresponding to the first and second geographic locations and the at least one geographic position along the shipping route;

corresponding the retrieved ambient temperature to an ambient temperature within the shipping container;

corresponding the ambient temperature within the shipping container to a product temperature of the product disposed within the shipping container;

developing a cumulative thermal exposure of the product using the corresponding product temperature; and determining if the cumulative thermal exposure of the product is within the thermal product-keeping exposure profile.

2. The method according to claim 1 further comprising the step of determining a temperature within the shipping container at a top wall of the shipping container by increasing the corresponding ambient temperature within the shipping container by a value of less than or equal to about 20 degrees F.; and determining if the ambient temperature at the top wall of the shipping container is within the thermal product-keeping exposure profile.

3. The method according to claim 1 wherein the range of ambient temperature is within a statistical tolerance.

4. The method according to claim 1 wherein defining a shipping route from a first geographic location to a second geographic location is accomplished by a plurality of shipping modes selected from the group consisting of truck, rail, airplane, ship, customs, storage and staging area.

5. A method of determining a cumulative thermal exposure of a plurality of products disposed within a single shipping container, the method comprising:

defining a shipping route from a first geographic location to a second geographic location, the shipping route comprising at least one geographic position intermediate the first and second geographic location;

providing a thermal product-keeping exposure profile for the plurality of products;

providing thermal characteristics of the single shipping container;

providing a worldwide historical weather database of ambient temperatures;

retrieving ambient temperatures from the historical weather database corresponding to the geographic locations and the geographic position of the shipping route;

modeling the plurality of products as a lumped sum mass;

modeling a heat transfer between the retrieved ambient temperature and the lumped sum mass to determine a corresponding product temperature;

comparing the corresponding product temperature to the thermal product-keeping exposure profile;

developing a cumulative thermal exposure of the plurality of products using the corresponding product temperatures; and determining if the cumulative thermal exposure of the plurality of products is within the thermal product-keeping exposure profile.

6. The method according to claim 5 further comprising the step of determining a temperature within the shipping container at a top wall of the shipping container by increasing the corresponding ambient temperature within the shipping container by a value of less than or equal to about 20 degrees F.; and determining if the ambient temperature at the top wall of the shipping container is within the thermal product-keeping exposure profile.

7. The method according to claim 5 wherein the range of ambient temperature is within a statistical tolerance.

8. The method according to claim 5 wherein defining a shipping route from a first geographic location to a second geographic location is accomplished by a plurality of shipping modes selected from the group consisting of truck, rail, airplane, ship, customs, storage and staging area.

9. A computer-based system for determining whether a conditioned environment is needed to ship a product within a shipping container, the method comprising:

first means defining a shipping route from a first geographic location to a second geographic location, the shipping route comprising at least one geographic position intermediate the first and second geographic location, the shipping route being defined by a plurality of shipping modes selected from the group consisting of truck, rail, airplane, ship, customs, storage and staging area;

second means for providing a thermal product-keeping exposure profile for the product;

third means for providing thermal characteristics of the shipping container;

fourth means for providing worldwide historical weather data;

retrieving means for retrieving ambient temperatures from the worldwide historical weather database corresponding to the first and second geographic locations and the at least one geographic position along the shipping route;

corresponding means for corresponding the retrieved ambient temperature to a product temperature;

comparison means for comparing the product temperature to the thermal product-keeping exposure profile; and determination means determining if the product temperature is within the thermal product-keeping exposure profile.

10. A method of determining a cumulative thermal exposure of an entity disposed within a container, the method comprising:

defining a first geographic location;

providing a thermal product-keeping exposure profile for the entity;

providing thermal characteristics of the container;

providing a historical weather database of ambient temperature;

retrieving an ambient temperature from the historical weather database corresponding to the first geographic location;

corresponding the retrieved ambient temperature to an ambient temperature within the container;

corresponding the ambient temperature within the container to a product temperature of the entity disposed within the container;

developing a cumulative thermal exposure of the entity using the corresponding entity temperature; and determining if the cumulative thermal exposure of the entity is within the thermal product-keeping exposure profile.

* * * * *